(12) United States Patent
Lee et al.

(10) Patent No.: US 11,222,448 B2
(45) Date of Patent: Jan. 11, 2022

(54) METHOD AND APPARATUS FOR MEASURING MEASUREMENT OF TWO-DIMENSIONAL PATTERN CORRESPONDING TO THREE-DIMENSIONAL VIRTUAL CLOTHING

(71) Applicant: CLO Virtual Fashion Inc., Seoul (KR)

(72) Inventors: Hohyun Lee, Seoul (KR); Yeji Kim, Seoul (KR)

(73) Assignee: CLO Virtual Fashion Inc., Seoul (KR)

( * ) Notice: Subject to any disclaimer, the term of this patent is extended or adjusted under 35 U.S.C. 154(b) by 0 days.

(21) Appl. No.: 17/027,426

(22) Filed: Sep. 21, 2020

(65) Prior Publication Data

US 2021/0217214 A1   Jul. 15, 2021

(30) Foreign Application Priority Data

Aug. 19, 2019 (KR) ................. 10-2019-0101363
Aug. 19, 2020 (KR) ................. 10-2020-0104206

(51) Int. Cl.
*G06T 11/20* (2006.01)
*G06T 15/00* (2011.01)
*G06T 15/10* (2011.01)

(52) U.S. Cl.
CPC .......... *G06T 11/203* (2013.01); *G06T 15/005* (2013.01); *G06T 15/10* (2013.01)

(58) Field of Classification Search
CPC ..................................................... G06T 11/203
See application file for complete search history.

(56) References Cited

U.S. PATENT DOCUMENTS

| 6,208,352 B1* | 3/2001 | Blackwell ............... G06T 15/30 |
| | | 345/441 |
| 2006/0125830 A1* | 6/2006 | Piponi ..................... G06T 13/20 |
| | | 345/473 |
| 2012/0086783 A1* | 4/2012 | Sareen .................... G06T 19/00 |
| | | 348/47 |
| 2016/0314604 A1* | 10/2016 | Oh .......................... G06T 11/20 |
| 2021/0034874 A1* | 2/2021 | Matsushita ........ G06K 9/00671 |

FOREIGN PATENT DOCUMENTS

KR   10-2012-0043642 A   5/2012
KR   10-1665653 B1   10/2016

* cited by examiner

*Primary Examiner* — Phi Hoang
(74) *Attorney, Agent, or Firm* — Fenwick & West LLP (57) ABSTRACT

A method and apparatus for measuring a measurement of a two-dimensional (2D) pattern receives a plurality of points in a space in which a 2D pattern of clothing is displayed, determines an attribute of an area in which the points are included, measures a length of a line segment using the points based on the determined attribute of the area, and outputs the length of the line segment.

20 Claims, 8 Drawing Sheets

METHOD AND APPARATUS FOR MEASURING MEASUREMENT OF TWO-DIMENSIONAL PATTERN CORRESPONDING TO THREE-DIMENSIONAL VIRTUAL CLOTHING

CROSS-REFERENCE TO RELATED APPLICATIONS

This application claims the benefit of Republic of Korea Patent Application No. 10-2019-0101363 filed on Aug. 19, 2019, and Republic of Korea Patent Application No. 10-2020-0104206 filed on Aug. 19, 2020, the entire disclosures of which are incorporated herein by reference for all purposes.

BACKGROUND

1. Field of the Invention

One or more example embodiments relate to a method and apparatus for measuring a measurement of a two-dimensional (2D) pattern corresponding to three-dimensional (3D) virtual clothing.

2. Description of the Related Art

Clothes appear in three dimensions when worn on a person's body, but they are more in two dimensions because they are actually a combination of pieces of fabric cut according to a two-dimensional (2D) pattern. Because fabric which is a material for clothes is flexible, it may be varied in appearance from moment to moment according to a body shape or motion of a person who wears it. For example, clothes worn on a body may slip down or become wrinkled and folded by gravity, the wind, or collisions with the body.

There may be some cases that need to measure a length between two points of three-dimensional (3D) virtual clothing. However, measuring an accurate length may not be easy for various reasons. For example, when measuring a distance or length between two points from simulated 3D virtual clothing, it may not be easy to measure an accurate length of source fabric because polygons of a mesh forming the virtual clothing are affected by gravity with material and physical laws of the source fabric being applied and are thus stretched to some extent.

The above description has been possessed or acquired by the inventor(s) in the course of conceiving the present disclosure and is not necessarily an art publicly known before the present application is filed.

SUMMARY

As aspect provides a method and apparatus that measures a length of two desired points by measuring a length on a two-dimensional (2D) pattern corresponding to three-dimensional (3D) virtual clothing or in a space in which the 2D pattern is displayed, instead of measuring a length between two points in the 3D virtual clothing.

Another aspect provides a method and apparatus that changes a length of a line segment between two points on a 2D pattern based on a strain rate of the 2D pattern and measures the changed length of the line segment between the two points, without a need to reset two points from which a length therebetween is to be measured from a changed 2D pattern.

Still another aspect provides a method and apparatus that readily measures various measurements including, for example, a length of a line segment inside a 2D pattern in a space in which the 2D pattern is displayed, a length of a line segment outside the 2D pattern in the space, and a length of a line segment stretched to the 2D pattern from a remaining area in the space from which the 2D pattern is excluded.

According to an aspect, there is provided a method of measuring a measurement of a two-dimensional (2D) pattern, the method including receiving, as an input, a plurality of points in a space in which a 2D pattern of clothing is displayed, determining an attribute of an area in which the points are included in the space, measuring a length of a line segment using the points based on the determined attribute of the area, and outputting the length of the line segment.

The determining of the attribute of the area may include determining the attribute of the area in which the points are included based on a data structure corresponding to each of the points.

The data structure corresponding to each of the points may include, in the form of a link, information associated with at least one of a pattern piece in which each of the points is positioned, a line in a pattern piece on which each of the points is positioned, or a point on a line in a pattern piece.

The attribute of the area may include at least one of a first attribute indicating that an area in which points are included corresponds to a same pattern piece of the 2D pattern, a second attribute indicating that an area in which points are included corresponds to a first pattern piece and a second pattern piece different from each other in the 2D pattern, a third attribute indicating that an area in which a start point and an end point among the points are included corresponds to an outer arc of a same pattern piece of the 2D pattern, a fourth attribute indicating that an area in which one of a start point and an end point among the points is included corresponds to a pattern piece of the 2D pattern and an area in which the other one of the start point and the end point is included corresponds to a remaining area in the space from which the 2D pattern is excluded, or a fifth attribute indicating that an area in which points are included corresponds to the remaining area in the space from the 2D pattern is excluded.

In response to the attribute of the area being determined to be the first attribute, the measuring of the length of the line segment may include measuring a first length of a first line segment connecting a start point and an end point that are input in the same pattern piece among the points, and setting the first length to be the length of the line segment.

In response to the attribute of the area being determined to be the second attribute, the measuring of the length of the line segment may include measuring a second length of a second line segment connecting a start point input in the first pattern piece and an end point input in the second pattern piece among the points, measuring a third length by subtracting, from the second length, a length of a connection line connecting a first intersection point at which the second line segment crosses a first outer line of the first pattern piece and a second intersection point at which the second line segment crosses a second outer line of the second pattern piece, and setting the third length to be the length of the line segment.

The method may further include receiving, as an input, a changed position of one of a start point and an end point among the points. The measuring of the length of the line segment may include measuring the length of the line segment based on the changed position of the one point.

In response to the attribute of the area being determined to be the third attribute, the measuring of the length of the line segment may include measuring respective lengths of a third line segment and a fourth line segment that extend from the start point and the end point, respectively, and are perpendicular to each other, calculating a length of the outer arc based on the lengths of the third line segment and the fourth line segment, and setting the length of the outer arc to be the length of the line segment.

In response to the attribute of the area being determined to be the fourth attribute, the measuring of the length of the line segment may include measuring a length of an inner line connecting a point included in a pattern piece among the points and an intersection point crossing an outer line of the pattern piece, measuring a length of an outer line connecting the intersection point and a point included in the remaining area among the points, and setting, to be the length of the line segment, at least one of the length of the inner line, the length of the outer line, or a sum of the length of the inner line and the length of the outer line.

In response to the attribute of the area being determined to be the fifth attribute, the measuring of the length of the line segment may include measuring a fifth length of a fifth line segment connecting a start point and an end point among the points input in the remaining area, and setting the fifth length to be the length of the line segment.

The method may further include receiving, as an input, a strain rate of the 2D pattern, and deforming the length of the line segment based on the strain rate of the 2D pattern.

The receiving of the points may include setting, as a start point, a first point input along a preset first input pattern among the points, setting, as at least one intermediate point, at least one second point input along a preset second input pattern after setting the start point among the points, and setting, as an end point, a third point input along the second input pattern after setting the start point or the intermediate point among the points.

The 2D pattern may be modeled with a mesh including a plurality of polygons. Among the points, at least one point input in an inside of the 2D pattern and on an outer line of the 2D pattern may be mapped to the polygons.

The 2D pattern may be modeled with a mesh including a plurality of polygons. Among points, at least one point input in the remaining area in the space from which the 2D pattern is excluded may be defined by a relative position with respect to the 2D pattern.

A non-transitory computer-readable storage medium storing instructions that, when executed by a processor, cause the processor to perform the method of claim 1.

A computer program embodied on a non-transitory computer-readable medium may be configured to control a processor to perform the method of measuring a measurement of a 2D pattern in conjunction with hardware.

According to another aspect, there is provided an apparatus for measuring a measurement of a 2D pattern, the apparatus including a user interface (UI) configured to receive, as an input, a plurality of points in a space in which a 2D pattern of clothing is displayed, a processor configured to determine an attribute of an area in which the points are included in the space and measure a length of a line segment using the points based on the determined attribute of the area, and an output device configured to output the length of the line segment.

The processor may determine the attribute of the area based on a data structure corresponding to each of the points.

The attribute of the area may include at least one of a first attribute indicating that an area in which points are included corresponds to a same pattern piece of the 2D pattern, a second attribute indicating that an area in which points are included corresponds to a first pattern piece and a second pattern piece different from each other in the 2D pattern, a third attribute indicating that an area in which a start point and an end point among the points are included corresponds to an outer arc of a same pattern piece of the 2D pattern, a fourth attribute indicating that an area in which one of a start point and an end point among the points is included corresponds to a pattern piece of the 2D pattern and an area in which the other one of the start point and the end point is included corresponds to a remaining area in the space from which the 2D pattern is excluded, or a fifth attribute indicating that an area in which points are included corresponds to the remaining area in the space from the 2D pattern is excluded.

The processor may measure a second length of a second line segment connecting a start point input in the first pattern piece and an end point input in the second pattern piece, measure a third length by subtracting, from the second length, a connection line connecting a first intersection point at which the second line segment crosses a first outer line of the first pattern piece and a second intersection point at which the second line segment crosses a second outer line of the second pattern piece, and set the third length to be the length of the line segment.

The processor may measure respective lengths of a third line segment and a fourth line segment that extend from the start point and the end point, respectively, and are perpendicular to each other, calculate a length of the outer arc based on the lengths of the third line segment and the fourth line segment, and set the length of the outer arc to be the length of the line segment.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, embodiments are described in detail with reference to the accompanying drawings. With respect to the descriptions of the drawings, like reference numerals refer to like elements. Various modifications are possible in various embodiments described below. Embodiments described below are not intended to be limited to the implementation forms, and it is understood that it should include all modifications, equivalents, and/or alternatives according to various embodiments.

The terminology used herein is for the purpose of describing particular examples only and is not intended to limit the example embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the inventive concept.

Furthermore, in describing example embodiments with reference to the accompanying drawings, the same reference denotations are assigned to the same elements without regard to the drawing denotations, a duplicated description thereof will be omitted. When it is determined that a detailed description of the related well-known technology unnecessarily blurs the gist of embodiments in describing embodiments, a detailed description thereof will be omitted.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The same name may be used to describe an element included in the examples described above and an element having a common function. Unless otherwise mentioned, the descriptions of the examples may be applicable to the following examples, and thus duplicated and redundant descriptions will be omitted for conciseness.

Figure 1:
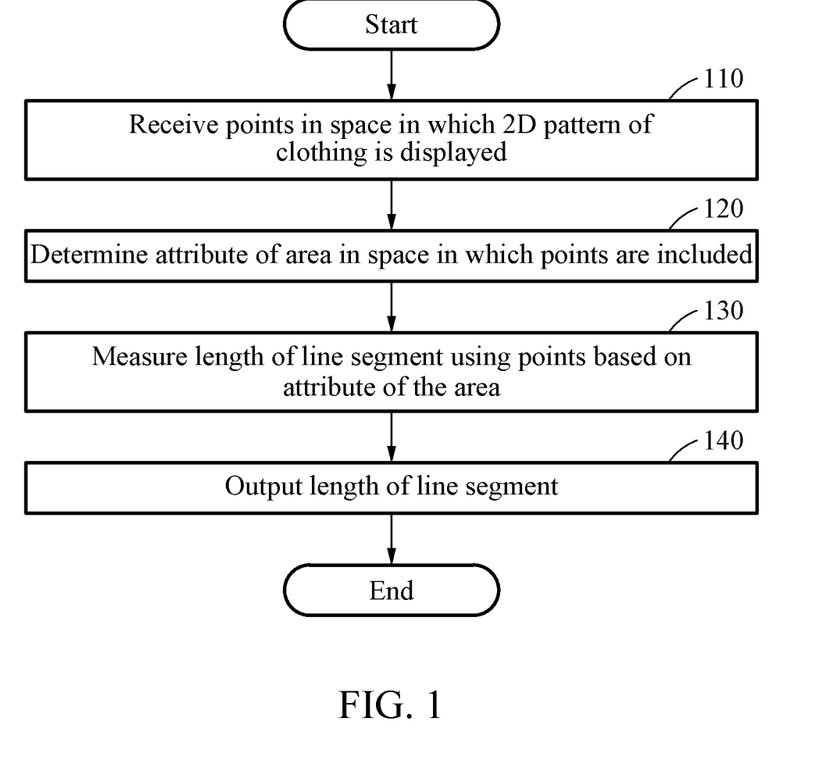
FIG. 1 is a flowchart illustrating an example of a method of measuring a measurement of a two-dimensional (2D) pattern according to an example embodiment.

FIG. 1 is a flowchart illustrating an example of a method of measuring a measurement of a two-dimensional (2D) pattern according to an example embodiment. Referring to FIG. 1, in operation 110, an apparatus for measuring a measurement of a 2D pattern (hereinafter simply "measuring apparatus") receives a plurality of points in a space in which a 2D pattern of clothing is displayed. The clothing described herein may be, for example, three-dimensional (3D) virtual clothing corresponding to the 2D pattern. The 2D pattern described herein may be a pattern on a 2D plane that is virtually produced virtually by a computer program. The 2D pattern may be, for example, a clothing pattern used to produce clothing a user desires to drape around or over a 3D avatar. The 2D pattern may include pieces (or hereinafter "pattern pieces") corresponding to body parts of the 3D avatar, for example, arms (e.g., sleeves), torso (front and back), neck, and legs. In addition, the term "drape" or "draping" described herein may be construed as a process of putting 3D clothing on a 3D avatar by combing a 2D pattern or 2D pattern pieces by a computer program.

The 2D pattern may be modeled with a mesh including a plurality of polygons, for example, triangles, to simulate the 3D virtual clothing. For example, three vertices of a triangle may be point masses having mass, and sides of the triangle may be represented as springs having elasticity which connects the point masses. Thus, the 2D pattern may be modeled by a mass-spring model, for example. The springs may have respective resistance values against, for example, stretch, shear, and bending, depending on a material property of fabric used. Each vertex may move according to the action of an external force such as gravity, and the action of an internal force such as stretch, shear, and bending. When a force being applied to each vertex is obtained by calculating the external force and the internal force, a speed of displacement and motion of each vertex may be obtained. In addition, a motion of the virtual clothing may be simulated through a motion of vertices of a polygon in each time step. By draping a 2D virtual clothing pattern formed with a mesh over a 3D avatar, it is possible to embody 3D virtual clothing that looks natural based on the laws of physics.

The 2D pattern may be modeled with a mesh including a plurality of polygons, and at least one point input in an inside of the 2D pattern and on an outer line of the 2D pattern among the plurality of points may be mapped to the plurality of polygons. In addition, at least one point input in a remaining area in the space from which the 2D pattern is excluded among the points may be defined by a relative position with respect to the 2D pattern.

Figure 2A:
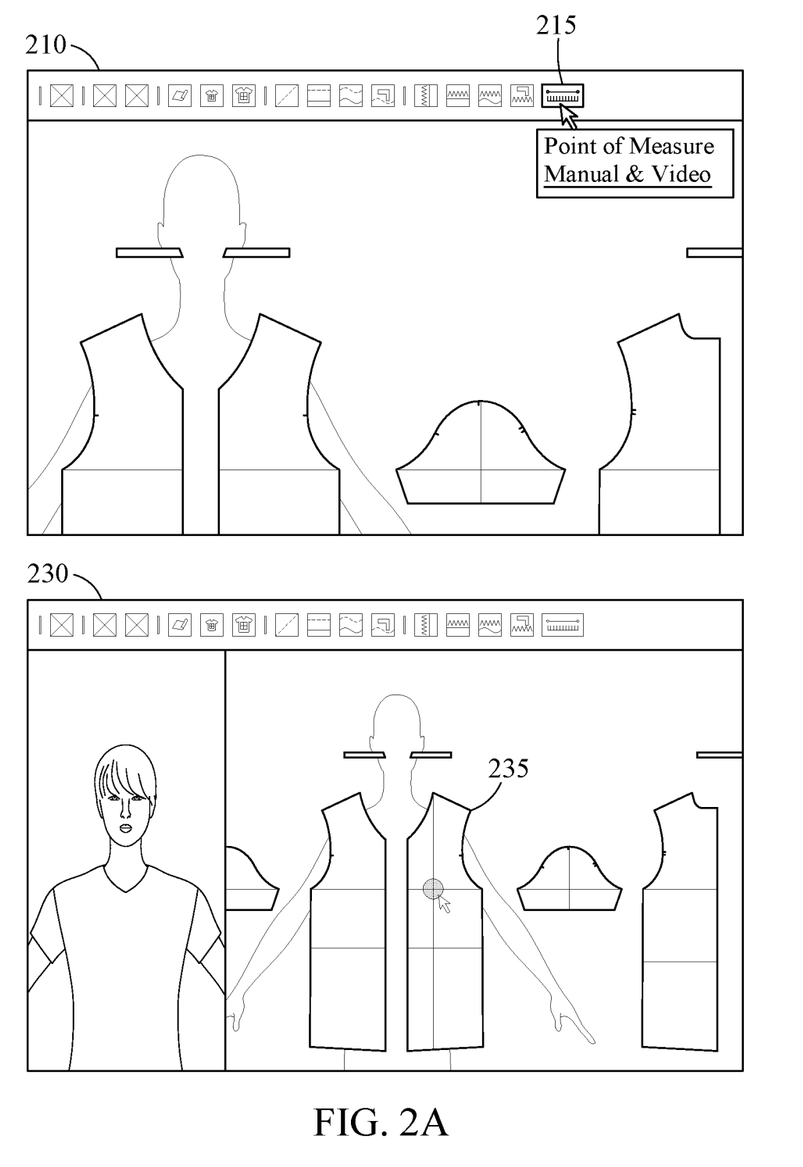
FIGS. 2A and 2B illustrate examples of receiving a plurality of points in a space in which a 2D pattern is displayed according to an example embodiment.
Figure 2B:
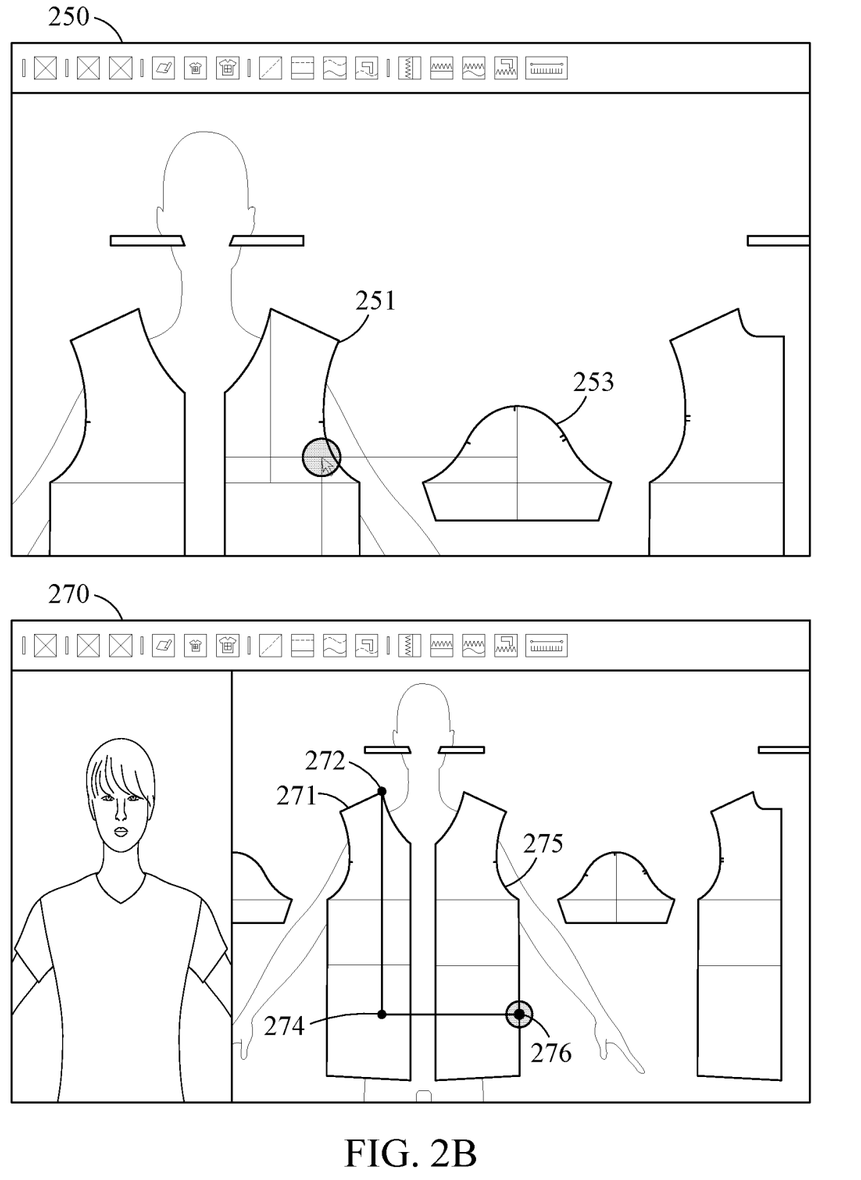

For example, in operation 110, the measuring apparatus may receive a plurality of points to measure a measurement or a length in the space through a screen of a user interface (UI). Hereinafter, how the measuring apparatus receives a plurality of points to measure a measurement will be described in detail with reference to FIG. 2.

In operation 120, the measuring apparatus determines an attribute of an area in the space in which the points are included. The area in which the points are included may be, for example, an inside of the 2D pattern, an outside of the 2D pattern, or an area stretched between the inside and the outside of the 2D pattern.

For example, in operation 120, the measuring apparatus may determine the attribute of the area in which the points are included based on a data structure corresponding to each of the points. The data structure corresponding to each of the points may include link-type information associated with at least one of a pattern piece in which each of the points is positioned, a line in a pattern piece in which each of the points is positioned, or a point on a line of a pattern piece. The data structure corresponding to each of the points may store information corresponding to each of the points in the form of a linked list, a tree, or a table, for example. The information corresponding to each of the points may include, for example, identification information of a pattern piece in which each of the points is positioned, identification of a line in a pattern piece in which each of the points is positioned, a coordinate of a point on a line of a pattern piece, and the like. However, the information is not limited to the foregoing examples.

The attribute of the area may include, for example, a first attribute indicating that an area in which points are included corresponds to a same pattern piece of the 2D pattern, a second attribute indicating that an area in which points are included corresponds to a first pattern piece and a second pattern piece that are different from each other in the 2D pattern, a third attribute indicating that an area in which a start point and an end point among the points are included corresponds to an outer arc of a same pattern piece of the 2D pattern, a fourth attribute indicating that an area in which one of a start point and an end point among the points is included corresponds to a pattern piece of the 2D pattern and an area in which the other one of the start point and the end point is included corresponds to a remaining area in the space from which the 2D pattern is excluded, and a fifth attribute indicating that an area in which points are included corresponds to the remaining area in the space from which the 2D pattern is excluded.

For example, a user may input two points, for example, a point A and a point B. In this example, the measuring apparatus may identify that the point A is on a second line of a third pattern piece and its coordinate is (25, 43), based on a data structure corresponding to each of the points A and B. In addition, the measuring apparatus may identify that the point B is adjacent to a first line of a second pattern piece and its coordinate is (02, 40), based on the data structure corresponding to each of the points A and B. The measuring apparatus may determine that areas to which the two points A and B belong correspond to different pattern pieces based on the data structure corresponding to each of the two points A and B. The measuring apparatus may then determine that an attribute of the areas to which the two points A and B belong is the second attribute.

Depending on examples, the data structure corresponding to each of the points may further include information as to whether a line of a pattern piece in which each of the points is positioned corresponds to an outer arc.

For example, a user may input two points, for example, a point F and a point G. In this example, the measuring apparatus may identify that the point F is on a first line corresponding to an outer arc of a second pattern piece of the 2D pattern and the point G is also on the first line corresponding to the outer arc of the second pattern piece, based on a data structure corresponding to each of the points F and G. The measuring apparatus may then determine that an attribute of an area to which the two points F and G belong is the third attribute.

For example, a user may input three points, for example, a point C, a point D, and a point E. In this example, the measuring apparatus may identify that the points C and D are in a first pattern piece of the 2D pattern and the point E is in the remaining area from which the 2D pattern is excluded, based on a data structure corresponding to each of the points C, D, and E. The measuring apparatus may then determine that an attribute of areas to which the three points C, D, and E belong is the fourth attribute.

As described above, the measuring apparatus may determine the attribute of the area to which the points belong based on information identified from the data structure stored corresponding to each of the points.

In operation 130, the measuring apparatus measures a length of a line segment using the points based on the attribute of the area determined in operation 120.

For example, when the attribute of the area is determined to be the first attribute, the measuring apparatus may measure a first length of a first line segment that connects a start point and an end point input in the same pattern piece among the points. The measuring apparatus may set the first length to be the length of the line segment.

For example, when the attribute of the area is determined to be the second attribute, the measuring apparatus may measure a second length of a second line segment that connects a start point input in a first pattern piece and an end point input in a second pattern piece. In this example, the measuring apparatus may measure a third length by subtracting, from the second length, a length of a connection line that connects a first intersection point at which the second line segment crosses a first outer line of the first pattern piece and a second intersection point at which the second line segment crosses a second outer line of the second pattern piece. The measuring apparatus may then set the third length to be the length of the line segment. Hereinafter, how a length of a line segment is measured as described in operation 130 in a case in which an attribute of an area is determined to be the second attribute will be described in detail with reference to FIGS. 4 and 5A.

For example, when the attribute of the area is determined to be the third attribute, the measuring apparatus may measure respective lengths of a third line segment and a fourth line segment that extend from the start point and the end point, respectively, and are perpendicular to each other. In this example, the measuring apparatus may calculate a length of the outer arc based on the lengths of the third line segment and the fourth line segment. The measuring apparatus may then set the length of the outer arc to be the length of the line segment. Hereinafter, how a length of a line segment is measured as described in operation 130 in a case in which an attribute of an area is determined to be the third attribute will be described in detail with reference to FIG. 6.

For example, when the attribute of the area is determined to be the fourth attribute, the measuring apparatus may measure a length of an inner line that connects a point in a pattern piece among the points to an intersection point crossing an outer line of the pattern piece. In addition, the measuring apparatus may measure a length of an outer line that connects the intersection point to a point in the remaining area among the points. The measuring apparatus may then set, to be the length of the line segment, at least one of the length of the inner line, the length of the outer line, or a sum of the length of the inner line and the length of the outer line.

Alternatively, for example, when the attribute of the area is determined to be the fifth attribute, the measuring apparatus may measure a fifth length of a fifth line segment that connects a start point and an end point among points input in the remaining area. The measuring apparatus may then set the fifth length to be the length of the line segment.

In operation 140, the measuring apparatus outputs the length of the line segment measured in operation 130. For example, the measuring apparatus may output, onto a screen of a display, a length of a line segment based on a plurality of points in a 2D pattern corresponding to draped simulated 3D clothing. Depending on examples, the measuring apparatus may be a 2D pattern output device configured to output a 2D pattern forming 3D clothing into a separate output material, such as, for example, paper and fabric. In such a case, the measuring apparatus may output, onto the 2D pattern, the length of the line segment that is based on the points.

FIGS. 2A and 2B illustrate examples of receiving a plurality of points in a space in which a 2D pattern is displayed according to an example embodiment. Hereinafter, how a plurality of points is input in a plurality of pattern pieces of a 2D pattern in a space in which the 2D pattern is displayed as shown in a screen 210 will be described in detail by referring to screens 210, 230, 250, and 270 illustrated in FIGS. 2A and 2B.

3D virtual clothing may be formed with a 2D pattern including a plurality pattern pieces in layers. Thus, it may be effective to arrange the pattern pieces not to overlap one another to perform an altering or editing task on at least one of the pattern pieces in a space in which the 2D pattern is displayed. However, in such a case, a gap between the pattern pieces may need to be considered, and thus it may not be easy to intuitively measure a distance between two points in different pattern pieces. In addition, when measuring a length between two points in different pattern pieces and then altering or editing a corresponding pattern piece, it may be inconvenient to reset the two points to measure a distance in the altered or edited pattern piece. In other cases, it may need to measure measurements in various areas by measuring a length between two points inside a pattern piece or outside a pattern piece, as needed.

According to an example, a user may select an element included in a 2D pattern from which a distance and/or length is desired to be measured, for example, pattern pieces of the 2D pattern. When the pattern pieces selected by the user are retrieved onto a screen, the user may select points from which a length or distance therebetween is desired to be measured in the pattern pieces displayed on the screen. In such an example, a method of measuring a measurement of a 2D pattern described herein may also be applied to a case in which two points inside a pattern piece are selected or a case in which a pattern piece is altered.

Hereinafter, a process of measuring a measurement in a space in which a 2D pattern corresponding to 3D clothing is displayed after the 2D pattern is selected by a user will be described in detail.

For example, when a 2D pattern is selected as shown in the screen 210 in FIG. 2A, a user may select a UI 215 for measuring a measurement that is displayed at an upper right end of the screen 210 and select points at desired positions in a space in which the 2D pattern and/or pattern pieces of the 2D pattern are displayed, and thus measure a measurement between the selected points. In this example, a measuring tape may be displayed between the selected points, and a distance or length may be displayed along with the measuring tape.

The UI 215 for measuring a measurement may be selected through a sub-menu of a path from the 2D pattern→measuring tape→measuring tape on a main menu, or be selected through an intuitive UI such as an icon in the form of a measuring tape displayed on a 2D toolbar.

After the UI 215 is selected, the measuring tape for measuring a measurement may be generated in the space in which 2D pattern of the clothing is displayed. The user may measure a measurement or distance between pattern pieces by generating the measuring tape by clicking a left side of a mouse, for example.

For example, a measurement between a plurality of points in a single pattern piece 235 as shown in the screen 230 may be measured. In this example, the user may click once the mouse at a point (or start point) at which the measurement is to be started in the single pattern piece 235, and then double-click the mouse at a point (or end point) at which the measurement is to be ended in the single pattern piece 235, thereby selecting or generating points to be measured or points of measurement (POMs).

According to an example embodiment, a measuring apparatus may set, as a start point, a first point input according to a preset first input pattern among a plurality of points. The first input pattern may correspond to a single mouse click, for example. When the start point is set, the measuring apparatus may generate an open point corresponding to the start point.

After setting the start point among the points, the measuring apparatus may set, as at least one intermediate point, at least one second point input according to a preset second input pattern. In addition, after setting the start point among the points, the measuring apparatus may set, as an end point, a third point input according to the second input pattern. The second input pattern may correspond to a double mouse click, for example. The first input pattern and/or the second input pattern are limited to the foregoing examples, but have various other forms.

When the intermediate point or the end point is set by the double mouse click, the measuring apparatus may generate a closed point corresponding to the set intermediate point or the set end point, and simultaneously display a line segment connecting the open point and the closed point. Thus, the line segment connecting the start point and the intermediate point, or the line segment connecting the start point and the end point may be displayed.

The measuring apparatus may generate the line segment connecting the open point and the closed point in the form of a dotted or broken line, for example. However, the form of the line segment is not limited to the foregoing example.

Although not illustrated, when the user pushes a Shift key of a keyboard on an application screen on which the line segment connecting the open point and the closed point is displayed, a guide line that is, for example, vertical, horizontal, and/or inclined by 45 degrees (°) with respect to a clicked point may be displayed.

When points from which a measurement is to be measured are selected completely through the process described above, the measuring apparatus may add the points selected in the single pattern piece 235 to a POM tab, for example. An example of the POM tab will be described in detail with reference to FIG. 3.

For example, there may be a case in which a measurement between a plurality of points in different pattern pieces 251 and 253 is measured as shown in the screen 250 in FIG. 2B. In this example, a user may select the points from which the measurement is to be measured by clicking once a mouse at a start point in the pattern piece 251 at which the measurement is to be started and double-clicking the mouse at an end point in the pattern piece 253 at which the measurement is to be ended. In this example, the different pattern pieces 251 and 253 in which the points are spread may be referred to herein as a pattern group.

When the points from which the measurement is to be measured are selected from the pattern group, the points selected from the pattern group may be added as a single list to the POM tab, for example. Here, a line segment that connects a first intersection point at which a line segment connecting the pattern pieces 251 and 253 crosses an outer line of the pattern piece 251 and a second intersection point at which the line segment connecting the pattern pieces 251 and 253 crosses an outer line of the pattern piece 253 may be referred to herein as a connection line. The connection line may be a line segment that is not positioned in a pattern piece, and not be included as a target line segment from which a length is to be measured by the measuring apparatus. The connection line may change in its length or position as the user changes a position or size of the pattern piece or changes points selected from the pattern piece.

Depending on examples, the user may input a movement distance by clicking a right side of the mouse while the connection line is being generated. Alternatively, to cancel the implementation of the connection line, the user may cancel an operation of generating the connection line by pushing a Backspace key, an ESC key, or Ctrl+Z keys on the keyboard while the connection line is being generated.

Depending on examples, the user may also select a plurality of points present between the start point and the end point. Here, the points to be selected from between the start point and the end point may be referred to herein as intermediate points.

For example, the user may select three points 272, 274, and 276 in different pattern pieces 271 and 275 as shown in the screen 270.

In this example, the measuring apparatus may measure a length of a first line segment between the two points 272 and 274 present in the same pattern piece 271, and a length of a second line segment between the point 274 in the pattern piece 271 and the point 276 in the pattern piece 275. The measuring apparatus may provide a length of each intermediate line segment such as the first line segment or the second line segment, in a total length. Alternatively, the measuring apparatus may provide the total length which is a sum of the length of the first line segment and the length of the second line segment. In such a case, the length of the second line segment may include a length of a connection line between the point 274 in the pattern piece 271 and the point 276 in the pattern piece 275. The measuring apparatus may provide the total length obtained by subtracting the length of the connection line from the length of the second line segment, or provide the total length without subtracting the length of the connection line.

Figure 3:
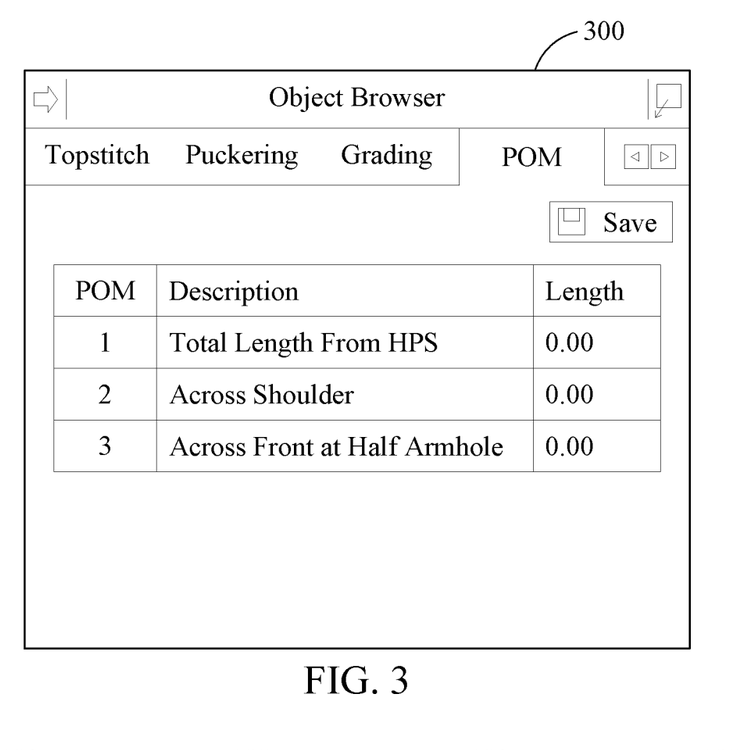
FIG. 3 illustrates an example of a screen of a user interface (UI) displaying a list of measurements measured in various areas of a 2D pattern according to an example embodiment.

FIG. 3 illustrates an example of a screen of a UI displaying a list of measurements measured in various areas of a 2D pattern according to an example embodiment. In FIG. 3, illustrated is an example of a list of POMs generated corresponding to points from which a measurement is to be measured.

When points from which a measurement is to be measured are selected through the process described above, a measuring tape may be generated between the selected points. A measuring apparatus may store, in a POM list 300, information corresponding to the points for which the measuring tape is generated (that is, the points from which the measurement is to be measured). The measuring apparatus may allow a user to verify a measurement of each portion by displaying the POM list 300 through a POM tab of "Object Browser."

The POM list 300 may include, for example, a number item in which numbers corresponding to the points are automatically numbered, a description item that provides a description of which portion of clothing corresponds to each of the points and/or provides a description of a name of a corresponding portion, a length item in which a length measured between the points is indicated, and the like. Although not illustrated, the POM list 300 may also include a portion for setting text color corresponding to the points, grading information of each of pattern pieces in which the points are included, and the like. However, examples to be included in the POM list 300 are not limited to the foregoing examples. Depending on examples, the POM list 300 may include a length on a 2D pattern, and/or a length in a state in which the 2D pattern is draped over an avatar in a simulated 3D space.

Figure 4:
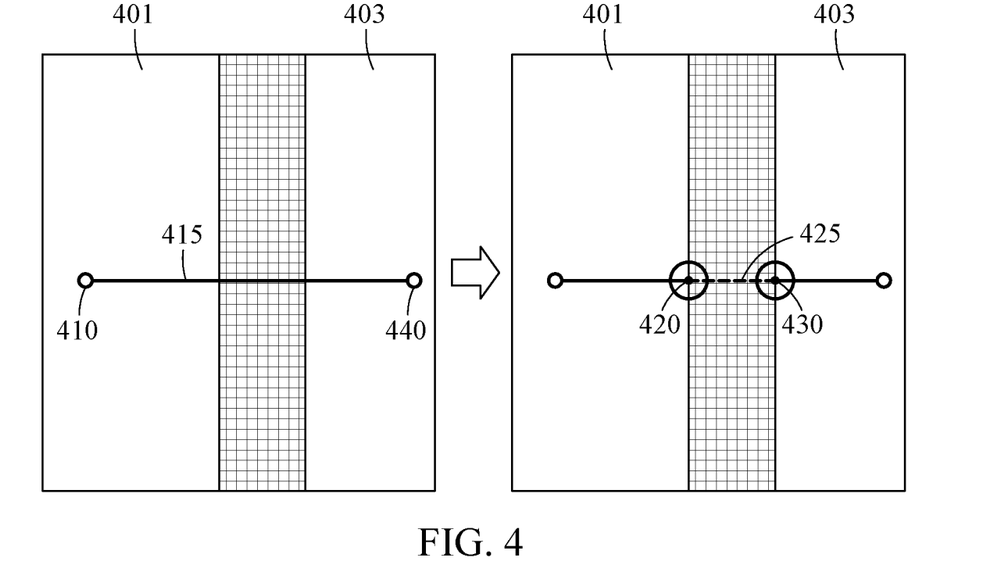
FIG. 4 illustrates an example of measuring a length of a line segment in a case in which an attribute of an area is a second attribute according to an example embodiment.

FIG. 4 illustrates an example of measuring a length of a line segment in a case in which an attribute of an area is a second attribute according to an example embodiment. Referring to FIG. 4, areas to which a plurality of points, for example, a start point, intermediate points, and an end point, belong may correspond to different pattern pieces.

For example, as illustrated, an area to which a start point 410 belongs may correspond to a pattern piece 401, and an area to which an end point 440 belongs may correspond to a pattern piece 403. Since the respective areas to which the start point 410 and the end point 440 belong correspond to the different pattern pieces, a measuring apparatus may determine an attribute of the areas to which the start point 410 and the end point 440 belong to be a second attribute.

In this example, the measuring apparatus may measure a length of a line segment 415 that connects the start point 410 input in the pattern piece 401 and the end point 440 input in the pattern piece 403. In addition, the measuring apparatus may measure a length of a connection line 425 (indicated by a broken line) that connects an intersection point 420 at which the line segment 415 crosses an outer line of the pattern piece 401 and an intersection point 430 at which the line segment 415 crosses an outer line of the pattern piece 403. The measuring apparatus may measure a length by subtracting the length of the connection line 425 from the length of the line segment 415. Here, the length of the connection line 425 may be changed as a user deforms or changes a position or size of a pattern piece or changes positions of points selected from the pattern piece.

Depending on examples, the user may set a movement distance of a line segment to be measured by selecting one point (or a movement point) by clicking a right side of a mouse in a pattern piece while the connection line 425 is being generated by the measuring apparatus. When the right side of the mouse is clicked in the pattern piece, a measurement input window may be displayed on a screen, and the user may input a certain distance value of the measurement input window and thus set the movement distance of the line segment to be measured. Here, the distance value displayed on the measurement input window may be, for example, a distance between a previous point and a point for which the mouse is right-clicked, which is set as a default value.

Alternatively, to cancel the setting of the movement distance of the line segment, the user may cancel the generation of a new connection line by pushing a Backspace key, an ESC key, or Ctrl+Z keys on a keyboard while the new connection line is being generated by the measuring apparatus. Hereinafter, how a measurement is measured in a case in which a connection line is changed by a user selecting a movement point will be described in detail with reference to FIG. 5A.

Figure 5A:
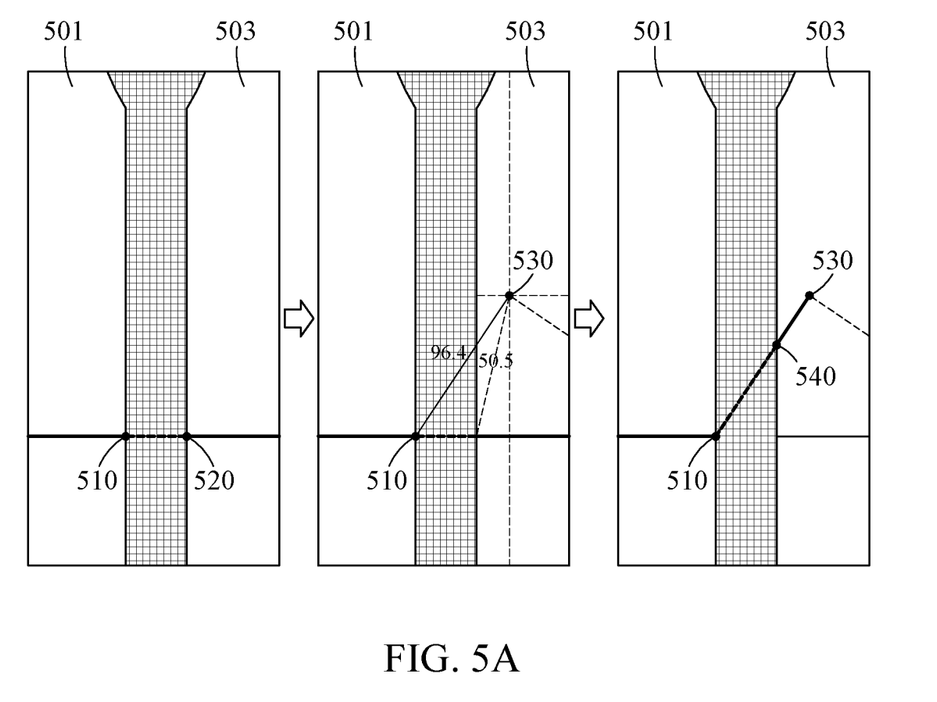
FIGS. 5A and 5B illustrate an example of measuring a length of a line segment in a case in which one point in an area of a second attribute is moved according to an example embodiment.

FIG. 5A illustrates an example of measuring a length of a line segment in a case in which one point in an area of a second attribute is moved according to an example embodiment. Referring to FIG. 5A, after a user selects a plurality of points in a space in which a 2D pattern is displayed, the user may move the selected points.

According to an example embodiment, after a user selects a plurality of points, for example, a start point, intermediate points, and an end point, the user may move one of the points or a position of a line segment connecting points among points.

For example, as illustrated, the user may input a start point 510 in a first pattern piece 501 and an end point 520 in a pattern piece 503, and then move a position of the end point 520 to a position of a movement point 530 in the second pattern piece 503. Here, any one of the start point 510 and the end point 520 may be selected by the user to be moved. Hereinafter, a point of which an initially input position is moved by the user may be referred to herein as a movement point, and a line segment that is moved in association with the movement point may be referred to herein as a movement line segment, for the convenience of description.

The user may select the movement point and/or the movement line segment as follows.

For example, the user may select a point or a line segment by clicking a cursor of a mouse. The user may select the end point 520 or a line segment connected to the end point 520 by moving the cursor of the mouse and clicking the cursor at the end point 520 or by selecting the line segment connected to the end point 520. The user may also select an entire line through double-click. In such a case, a double-clicked point, a point connected to a double-clicked line segment, or a double-clicked entire line may be selected. Alternatively, the user may select an area through mouse drag. In such a case, all points and lines included in the selected area may be selected.

In other cases, the user may select a clicked point and line segment through, for example, a multiple selection method using a Shift key and a left mouse click, or select a generated entire measuring tape through a multiple selection method using Ctrl and A keys.

The user may move an object selected by the foregoing method, for example, the end point 520 or the line segment connected to the end point 520, by dragging the object to a desired position.

When the movement point 530 is positioned inside the second pattern piece 503 as illustrated in FIG. 5A, an intersection point 540 between a line segment connecting the start point 510 and the movement point 530 and an outer line of the second pattern piece 503 may be calculated again, and thus a connection line connecting the start point 510 and the intersection point 540 may be updated. As the movement point 530 is determined, the end point 520 may be automatically deleted, or remained without being deleted and then be deleted afterward by the user.

The measuring apparatus may measure a length of a line segment from the start point 510 based on a position of the changed intersection point 540 and/or the movement point 530.

Figure 5B:
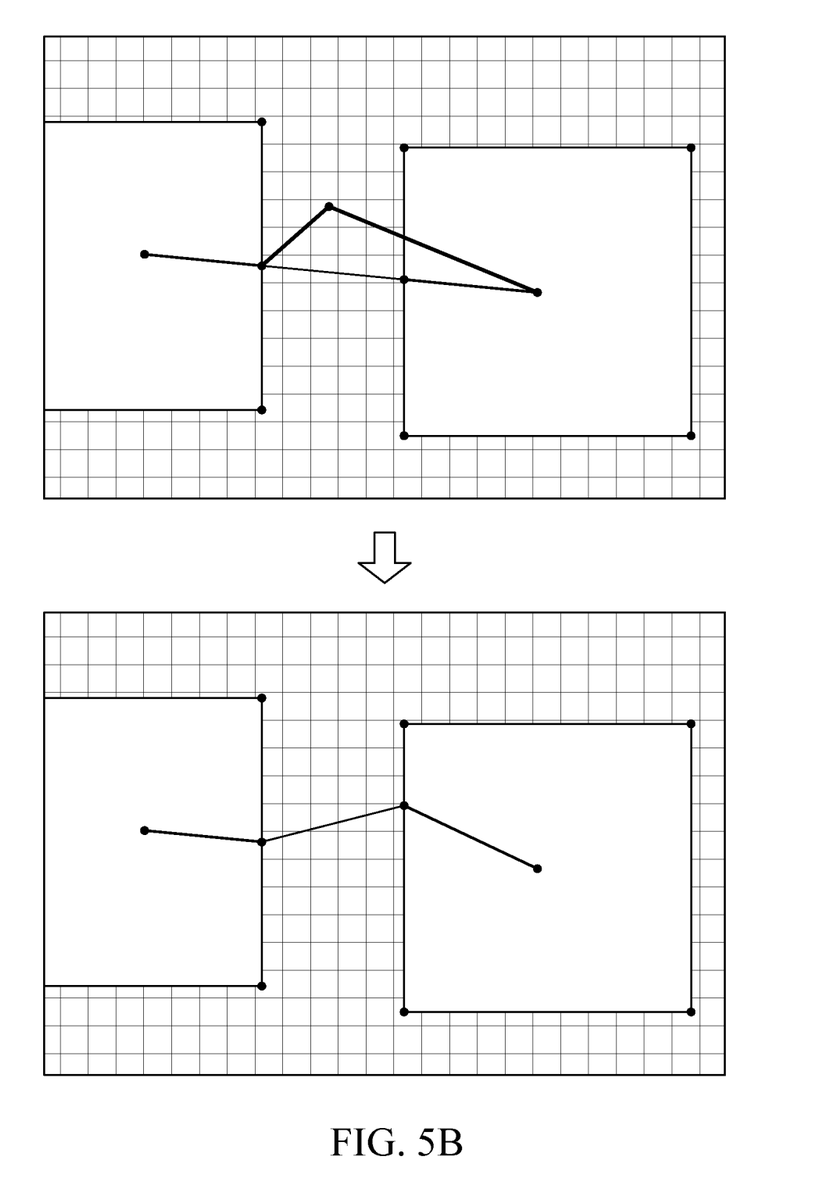

Dissimilar to the example illustrated in FIG. 5A, when a movement point is positioned outside a second pattern piece, a connection line may be updated only with both points, for example, a start point and an end point. That is, as illustrated in FIG. 5B, when a point of the connection line (e.g., a line between two pattern pieces) is moved to an outside of the second pattern piece (e.g., a point at which a bold line between the two pattern pieces is bent), the measuring apparatus may pull the point of the connection line downwards to an outer line of a corresponding pattern piece, as illustrated in a lower portion of FIG. 5B.

Depending on examples, the user may move the position of the end point 520 input in the second pattern piece 503 to a new third pattern piece which is different from the second pattern piece 503. In such a case, the connection line indicated in the second pattern piece 503 may disappear, and then a movement point and a new connection line may be generated in the third pattern piece. The user may directly input a movement distance through, for example, a right mouse click, while the point or the line segment is being moved. Based on the movement distance input by the user, the point or the line segment may be moved. The user may alter or edit a position of a point based on an outer line and/or an inner line of a pattern piece.

Alternatively, when the user alters or changes a length and a size of each portion of a 2D pattern, the 2D pattern may be altered or changed. When the 2D pattern is changed, positions of points input by the user may also be changed. In addition, intersection points between the points and an outer line and/or inner line of the 2D pattern may also be changed. In addition, the measuring apparatus may receive a strain rate of the 2D pattern. In such a case, the measuring apparatus may deform or change a measured length of a line segment by applying the strain rate of the 2D pattern.

Figure 6:
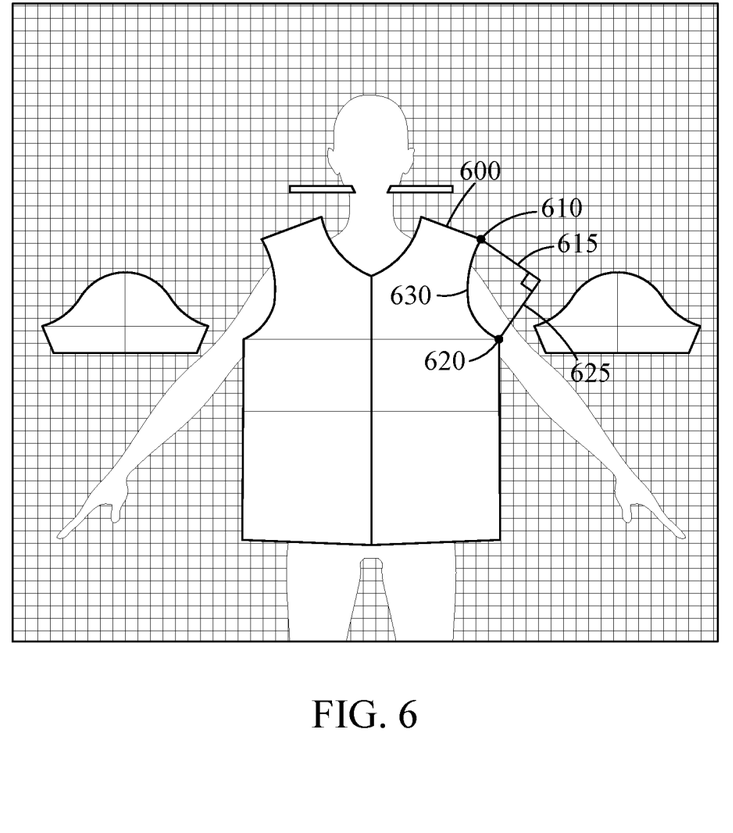
FIG. 6 illustrates an example of measuring a length of a line segment in a case in which an attribute of an area is a third attribute according to an example embodiment.

FIG. 6 illustrates an example of measuring a length of a line segment in a case in which an attribute of an area is a third attribute according to an example embodiment. Hereinafter, how a length of an outer arc of a pattern piece is measured will be described in detail with reference to FIG. 6.

For example, as illustrated in FIG. 6, an area to which a start point 610 and an end point 620 belong among a plurality of points input in a space in which a 2D pattern is displayed may correspond to an outer arc 630 of a same pattern piece 600. In this example, an attribute of this area is determined to be a third attribute. When the attribute of the area is determined to be the third attribute, a length of a line segment may be measured as follows.

In the example, a measuring apparatus may generate a line segment 615 extending from the start point 610 and a line segment 625 extending from the end point 620 such that the line segment 615 and the line segment 625 are perpendicular to each other. The measuring apparatus may measure a length of the line segment 615 and a length of the line segment 625, and calculate a length of the outer arc 630 based on the measured length of the line segment 615 and the measured length of the line segment 625. For example, the measuring apparatus may calculate the length of the outer arc 630 by multiplying the length of the line segment 615 or the length of the line segment 625 by a central angle (radian) of a circular sector of the outer arc 630. The measuring apparatus may set the length of the outer arc 630 to be a length of a line segment to be measured.

The process described above with reference to FIG. 6 may also be applied to measure a curvature of an arc in addition to a length of the arc. The measuring apparatus may represent a distance between patterns by measuring two line segments that extend to an outside of a 2D pattern and are perpendicular to each other. Here, an external point outside the 2D pattern may be defined by a relative position with respect to the 2D pattern.

Figure 7:
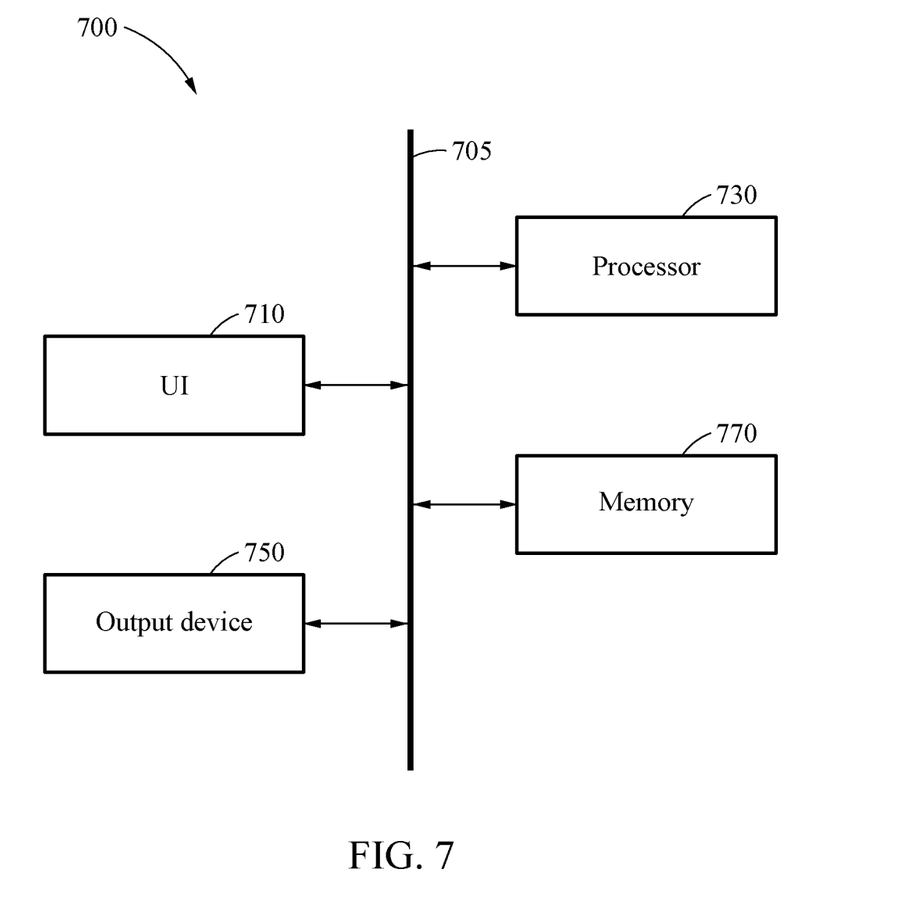
FIG. 7 is a block diagram illustrating an example of an apparatus for measuring a measurement of a 2D pattern according to an example embodiment.

FIG. 7 is a block diagram illustrating an example of a measuring apparatus for measuring a measurement of a 2D pattern according to an example embodiment. Referring to FIG. 7, a measuring apparatus 700 includes a UI 710, a processor 730, an output device 750, and a memory 770. The UI 710, the processor 730, the output device 750, and the memory 770 may communicate with one another through a communication bus 705.

The UI 710 may receive a plurality of points in a space in which a 2D pattern of clothing is displayed. The UI 710 may receive a touch input and the like through, for example, a stylus pen, a mouse, a keyboard, or a touch interface.

The processor 730 may determine an attribute of an area in the space in which the points are included. The processor 730 may measure a length of a line segment using the points based on the determined attribute of the area.

The processor 730 may determine the attribute of the area in which the points are included based on a data structure corresponding to each of the points. The attribute of the area may include, for example, a first attribute indicating that an area in which points are included corresponds to a same pattern piece of the 2D pattern, a second attribute indicating that an area in which points are included corresponds to a first pattern piece and a second piece that are different from each other in the 2D pattern, a third attribute indicating that an area in which a start point and an end point among the points are included corresponds to an outer arc of a same pattern piece of the 2D pattern, a fifth attribute indicating that an area in which one of the start point and the end point among the points is included corresponds to a pattern piece of the 2D pattern and an area in which the other one of the start point and the end point is included in a remaining area in the space from which the 2D pattern is excluded, and a fifth attribute indicating that an area in which points are included corresponds to the remaining area in the space from which the 2D pattern is excluded.

The processor 730 may measure a second length of a second line segment that connects a start point input in a first pattern piece and an end point input in a second pattern piece. The processor 730 may measure a third length by subtracting, from the second length, a connection line that connects a first intersection point at which the second line segment crosses a first outer line of the first pattern piece and a second intersection point at which the second line segment crosses a second outer line of the second pattern piece. The processor 730 may then set the third length to be the length of the line segment.

Alternatively, the processor 730 may measure respective lengths of a third line segment and a fourth line segment that extend from the start point and the end point, respectively, and are perpendicular to each other. The processor 730 may calculate a length of an outer arc based on the lengths of the third line segment and the fourth line segment. The processor 730 may then set the length of the outer arc to be the length of the line segment.

The output device 750 may output the length of the line segment measured by the processor 730. The output device 750 may output, on a screen of a display or to an outside of the measuring apparatus 700, a length of a line segment based on a plurality of points on draped simulated 3D clothing and/or on a 2D pattern corresponding to the 3D clothing. The output device 750 may be, for example, the display or a communication interface configured to communicate with the outside of the measuring apparatus 700.

Depending on examples, the output device 750 may be a 2D pattern output device configured to output a 2D pattern forming 3D clothing onto a separate output material, for example, paper and fabric. In such a case, the processor 730 may output, on the 2D pattern, a length of a line segment based on a plurality of points.

The memory 770 may store various sets of information generated in a processing operation of the processor 730 described in the foregoing. In addition, the memory 770 may store various sets of data and programs, and the like. The memory 770 may include a volatile or nonvolatile memory. The memory 770 may include a massive storage medium such as a hard disk to store various sets of data.

In addition, the processor 730 may perform one or more, or all, of the methods described above with reference to FIGS. 1 through 6 or algorithms corresponding to the methods. The processor 730 may be a data processing device embodied by hardware having a circuit of a physical structure to execute desired operations. The desired operations may include, for example, codes or instructions included in a program. The data processing device embodied by hardware may include, for example, a microprocessor, a central processing unit (CPU), a processor core, a multi-core processor, a multiprocessor, an application-specific integrated circuit (ASIC), and a field-programmable gate array (FPGA).

The processor 730 may execute a program to control the measuring apparatus 700. A program code executed by the processor 730 may be stored in the memory 770. The processor 730 may be embodied as s CPU, a graphics processing unit (GPU), or a neural network processing unit (NPU), for example.

According to example embodiments described herein, it is possible to readily measure a length between two desired points by measuring a length between two points on a 2D pattern corresponding to 3D virtual clothing or in a space in which the 2D pattern is displayed, rather than by measuring a length between two points of the 3D virtual clothing.

According to example embodiments described herein, by changing a length of a line segment between two points on a 2D pattern based on a strain rate of the 2D pattern, it is possible to measure the changed length of the line segment between the two points, without resetting two points from which a length therebetween is to be measured in a changed 2D pattern.

According to example embodiments described herein, it is possible to readily measure various measurements including, for example, a length of a line segment inside a 2D pattern in a space in which the 2D pattern is displayed, a length of a line segment outside the 2D pattern in the space, and a length of a line segment stretched to the 2D pattern from a remaining area in the space from which the 2D pattern is excluded.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of taking a measurement of a two-dimensional (2D) pattern, comprising:
    receiving a plurality of points in a space in which a 2D pattern of clothing is displayed;
    determining attributes of areas in which the points are located, wherein the attributes indicate at least whether the points are located in a same pattern piece of the clothing or different pattern pieces of the clothing;
    determining a length of a line segment using the points based on the determined attributes of the areas, the determined length of the line segment changed to account for separation between the pattern pieces responsive to determining that the points are located in different pattern pieces; and
    outputting the length of the line segment.

2. The method of claim 1, wherein the determining of the attributes of the areas comprises:
    analyzing a data structure corresponding to each of the points to determine the attributes.

3. The method of claim 2, wherein the data structure corresponding to each of the points includes, in a form of a link, information associated with at least one of a pattern piece in which each of the points is positioned, a line in a pattern piece on which each of the points is positioned, or a point on a line in a pattern piece.

4. The method of claim 1, wherein the attributes of the areas comprises at least one of:
    a first attribute indicating that an area in which points are located corresponds to a same pattern piece of the 2D pattern;
    a second attribute indicating that an area of one of the points is located in a first pattern piece and an area of another of the points is located in a second pattern piece different from the first pattern piece;
    a third attribute indicating that an area in which a start point and an end point of the points are located corresponds to an outer arc of a same pattern piece of the 2D pattern;
    a fourth attribute indicating that an area including one of the start point and the end point of the points corresponds to a pattern piece of the 2D pattern, and an area including the other of the start point and the end point corresponds to a remaining area excluding the pattern piece of the 2D pattern; or
    a fifth attribute indicating that areas including the points outside the 2D pattern.

5. The method of claim 4, wherein, in response to the attributes of the areas being determined to be of the first attribute, determining of the length of the line segment comprises:
    determining a first length of a first line segment connecting a start point and an end point of the same pattern piece; and
    setting the first length as the length of the line segment.

6. The method of claim 4, wherein, in response to the attributes of the areas being determined to be of the second attribute, determining the length of the line segment comprises:
    determining a length of a first line segment connecting a start point in the first pattern piece and an end point in the second pattern piece;
    determining a second length by subtracting, from the first length, a length of a connection line connecting a first intersection point at which the second line segment crosses a first outer line of the first pattern piece and a second intersection point at which the second line segment crosses a second outer line of the second pattern piece; and
    setting the second length to be the length of the line segment.

7. The method of claim 6, further comprising:
    receiving, as an input, a changed position of one of the start point and the end point,
    wherein determining the length of the line segment comprises:

determining the length of the line segment based on the changed position of the one of the start point and the end point.

8. The method of claim 4, wherein, in response to the attributes of the areas being determined to be of the third attribute, the measuring of the length of the line segment comprises:
determining lengths of a first line segment and a second line segment, the first line segment extending from the start point to meet the second line segment and perpendicular to the second line segment;
determining a length of the outer arc based on the lengths of the first line segment and the second line segment; and
setting the length of the outer arc as the length of the line segment.

9. The method of claim 4, wherein, in response to the attributes of the areas being determined to be of the fourth attribute, determining the length of the line segment comprises:
determining a length of an inner line connecting a point located in a pattern piece and an intersection point crossing an outer line of the pattern piece;
determining a length of an outer line connecting the intersection point and a point located in the remaining area; and
setting, as the length of the line segment, at least one of the length of the inner line, the length of the outer line, or a sum of the length of the inner line and the length of the outer line.

10. The method of claim 4, wherein, in response to the attributes of the areas being determined to be of the fifth attribute, determining the length of the line segment comprises:
determining a length of a line segment connecting a start point and an end point outside the 2D pattern; and
setting the length of the line segment as the length of the line segment.

11. The method of claim 1, further comprising:
receiving, as an input, a strain rate of the 2D pattern; and
deforming the length of the line segment based on the strain rate of the 2D pattern.

12. The method of claim 1, wherein the receiving of the points comprises:
setting, as a start point, a first point at which a first input is received;
after setting the start point, setting, as at least one intermediate point, at least one second point at which a second input subsequent to the first input is received; and
after setting the start point or the at least one intermediate point, setting, as an end point, a third point at which a third input subsequent to the second input is received.

13. The method of claim 1, wherein the 2D pattern is modeled with a mesh including a plurality of polygons,
wherein, among the points, at least one point input in an inside of the 2D pattern and on an outer line of the 2D pattern is mapped to the polygons.

14. The method of claim 1, wherein the 2D pattern is modeled with a mesh including a plurality of polygons,
wherein at least one point outside the 2D pattern is defined by a relative position of the at least one point with respect to the 2D pattern.

15. A non-transitory computer-readable storage medium storing instructions thereon, the instructions, when executed by a processor, cause the processor to:
receive a plurality of points in a space in which a 2D pattern of clothing is displayed;
determine attributes of areas in which the points are located, wherein the attributes indicate at least whether the points are located in a same pattern piece of the clothing or different pattern pieces of the clothing;
determine a length of a line segment using the points based on the determined attributes of the areas, the determined length of the line segment changed to account for separation between the pattern pieces responsive to determining that the points are located in different pattern pieces; and
output the length of the line segment.

16. An apparatus for taking a measurement of a two-dimensional (2D) pattern, comprising:
a user interface (UI) device configured to receive, from a user, a plurality of points in a space in which a 2D pattern of clothing is displayed;
a processor coupled to a memory to execute instructions on the memory the memory instructions causing the processor to:
determine attributes of areas in which the points are located, wherein the attributes indicate at least whether the points are located in a same pattern piece of the clothing or different pattern pieces of the clothing, and
determine a length of a line segment using the points based on the determined attributes of the areas, the determined length of the line segment changed to account for separation between the pattern pieces responsive to determining that the points are located in different pattern pieces; and
an output device configured to output the length of the line segment.

17. The apparatus of claim 16, wherein the instructions further cause the processor analyze a data structure corresponding to each of the points to determine the attributes.

18. The apparatus of claim 16, wherein the attributes of the areas comprises at least one of:
a first attribute indicating that an area in which points are located corresponds to a same pattern piece of the 2D pattern;
a second attribute indicating that an area of one of the points is located in a first pattern piece and an area of another of the points is located in a second pattern piece different from the first pattern piece;
a third attribute indicating that an area in which a start point and an end point of the points are located corresponds to an outer arc of a same pattern piece of the 2D pattern;
a fourth attribute indicating that an area including one of the start point and the end point of the points corresponds to a pattern piece of the 2D pattern, and an area including the other of the start point and the end point corresponds to a remaining area excluding the pattern piece of the 2D pattern; or
a fifth attribute indicating that areas including the points outside the 2D pattern.

19. The apparatus of claim 18, wherein the instructions cause the processor to:
in response to the attributes of the areas being determined to be of the second attribute:
determine a length of a first line segment connecting a start point in the first pattern piece and an end point in the second pattern piece;
determine a second length by subtracting, from the first length, a length of a connection line connecting a first intersection point at which the second line segment crosses a first outer line of the first pattern piece and a second intersection point at which the second line segment crosses a second outer line of the second pattern piece; and set the second length to be the length of the line segment.

20. The apparatus of claim 18, wherein the instructions cause the processor to:

in response to the attributes of the areas being determined to be of the third attribute:

determine lengths of a first line segment and a second line segment, the first line segment extending from the start point to meet the second line segment and perpendicular to the second line segment;

determine a length of the outer arc based on the lengths of the first line segment and the second line segment; and set the length of the outer arc as the length of the line segment.

* * * * *